(12) United States Patent
Schad et al.

(10) Patent No.: US 8,932,040 B2
(45) Date of Patent: Jan. 13, 2015

(54) INJECTION UNIT WITH A PISTON POSITION MEASUREMENT SYSTEM

(75) Inventors: Robert D. Schad, Toronto (CA); Carsten Link, Burlington (CA); Stephen Mracek, Vaughan (CA)

(73) Assignee: Athena Automation Ltd., Vaughan (CA)

( * ) Notice: Subject to any disclaimer, the term of this patent is extended or adjusted under 35 U.S.C. 154(b) by 163 days.

(21) Appl. No.: 13/698,352

(22) PCT Filed: May 17, 2011

(86) PCT No.: PCT/CA2011/000568
§ 371 (c)(1),
(2), (4) Date: Dec. 13, 2012

(87) PCT Pub. No.: WO2011/143745
PCT Pub. Date: Nov. 24, 2011

(65) Prior Publication Data
US 2013/0108725 A1    May 2, 2013

Related U.S. Application Data

(60) Provisional application No. 61/345,406, filed on May 17, 2010.

(51) Int. Cl.
*B29C 45/82* (2006.01)
*B29C 45/80* (2006.01)
*B29C 45/50* (2006.01)
*B29C 45/76* (2006.01)
*G01B 21/16* (2006.01)

(52) U.S. Cl.
CPC .............. *B29C 45/80* (2013.01); *B29C 45/50* (2013.01); *B29C 45/76* (2013.01); *G01B 21/16* (2013.01); *B29C 2945/76096* (2013.01); *B29C 2945/76187* (2013.01)
USPC ............................................ 425/145; 425/149

(58) Field of Classification Search
CPC .... B29C 47/92; B29C 45/78; B29C 45/5008; B29C 45/1808
USPC .................. 425/140, 141, 144, 145, 148, 149
See application file for complete search history.

(56) References Cited

U.S. PATENT DOCUMENTS 3,693,946 A * 9/1972 Merritt ............................ 366/79
3,750,134 A * 7/1973 Weisend ........................ 345/618
(Continued)

FOREIGN PATENT DOCUMENTS

| CN | 201417215 Y | 3/2010 |
|---|---|---|
| DE | 4237360 | 6/1994 |

(Continued)

*Primary Examiner* — Tim Heitbrink
(74) *Attorney, Agent, or Firm* — Bereskin & Parr LLP/S.E.N.C.R.L., s.r.l.

(57) ABSTRACT

An injection unit includes a cylinder casing comprising an inner cylindrical surface extending along an axis, and a piston housed in the casing and translatable along the axis between an advanced and a retracted position. The piston includes a piston radial surface in facing relation to the inner cylindrical surface, and the piston radial surface has a measurement detection feature. A probe is fixed relative to the cylinder casing, the probe communicating with the measurement detection feature when the piston is in and moving between the advanced and retracted positions to measure the translation of the piston.

23 Claims, 8 Drawing Sheets

(56) References Cited

U.S. PATENT DOCUMENTS

| | | | |
|---|---|---|---|
| 3,797,808 A * | 3/1974 | Ma et al. | 366/78 |
| 3,825,235 A * | 7/1974 | Schwertfeger et al. | 425/146 |
| 3,859,400 A * | 1/1975 | Ma | 264/40.5 |
| 3,860,801 A * | 1/1975 | Hunkar | 700/203 |
| 3,904,078 A * | 9/1975 | Neff et al. | 222/1 |
| 3,932,083 A * | 1/1976 | Boettner | 425/145 |
| 3,941,534 A * | 3/1976 | Hunkar | 425/145 |
| 4,816,197 A * | 3/1989 | Nunn | 264/40.6 |
| 5,102,587 A | 4/1992 | Kumamura et al. | |
| 5,792,483 A | 8/1998 | Siegrist et al. | |
| 6,484,620 B2 | 11/2002 | Arshad et al. | |
| 7,291,297 B2 | 11/2007 | Weatherall et al. | |

FOREIGN PATENT DOCUMENTS

| | | |
|---|---|---|
| EP | 0992333 | 4/2000 |
| JP | 5245878 | 9/1993 |

* cited by examiner

INJECTION UNIT WITH A PISTON POSITION MEASUREMENT SYSTEM

CROSS REFERENCES TO RELATED APPLICATIONS

This application claims priority from U.S. Provisional Patent Application No. 61/345,406, filed on May 17, 2010, which is incorporated herein by reference in its entirety.

FIELD

The disclosure relates to injection units, such as for injection molding machines, and to apparatuses and methods for measuring the position of a piston of the injection unit.

INTRODUCTION

The following is not an admission that anything discussed below is prior art or part of the common general knowledge of persons skilled in the art.

U.S. Pat. No. 6,484,420 (Arshad et al.) discloses a hydraulic actuator having a cylinder with a piston that is moved by hydraulic fluid. A light guide in one end of the cylinder directs a laser beam into the cylinder, and off the piston where the beam is reflected. The beam then exits the cylinder through a second light guide. A control unit measures the time of flight of the laser beam and calculates the piston position.

U.S. Pat. No. 7,291,297 (Weatherall, et al.) discloses and contends that In a reciprocating (RS) injection unit environment, as shown in FIG. 1, a controller of the injection unit is arranged to continuously rotate the screw during both conventional plasticizing operation and shot injection. In this way the RS unit is more efficient, utilizing less energy and producing greater resin output. The injection unit includes a non-return valve adjacent a nozzle, which non-return valve is either configured to rotate with the screw to reduce wear or presented as a ball check style noon-return valve. In an injection molding environment, the rotating screw includes flights that allow granules of resin to melt and mix in spaces between adjacent flights, but the flights are arranged substantially to inhibit excessive displacement of resin around the flights. A screw position transducer 20 or the like, typically a Temposonic style, is preferably mounted on the housing 2 to measure the position of the feedscrew 6 longitudinally with respect to the barrel 1. Since the feedscrew 6 is connected to the end of the injection piston 5, the position sensor 20 also measures the position of the injection piston with respect to the housing.

SUMMARY

The following summary is provided to introduce the reader to the more detailed discussion to follow. The summary is not intended to limit or define the claims.

According to one aspect, an injection unit comprises: a cylinder casing comprising an inner cylindrical surface extending along an axis; a piston housed in the casing and translatable along the axis between an advanced and a retracted position, the piston comprising a piston radial surface in facing relation to the inner cylindrical surface, the piston radial surface comprising a measurement detection feature; and a probe fixed relative to the cylinder casing, the probe communicating with the measurement detection feature when the piston is in and moving between the advanced and retracted positions to measure the translation of the piston.

In some examples, the injection unit may include a pressure chamber extending radially between the inner cylindrical surface and the piston radial surface. The pressure chamber may contain a fluid to move the piston towards one of the advanced position and the retracted position when pressurized. In some examples, the probe may extend through the cylinder casing. In some examples, the cylinder casing may comprise an outer surface spaced radially outward from the inner cylindrical surface and a cavity extending therebetween, the cavity having opposed open ends at the inner cylindrical surface and the outer surface, and at least a portion of the probe may be received within the cavity.

In some examples, the measurement detection feature may comprise a plurality of annular piston teeth concentric with the axis and spaced axially apart along the piston radial surface. The probe may comprise a gear having gear teeth extending radially inwardly of the inner surface, the gear teeth engaged with the annular piston teeth, wherein translation of the piston induces rotation of the gear. The probe may further comprise a shaft rotationally driven by the gear, the shaft coupled to a sensor for sensing rotation of the shaft.

In some examples, the measurement detection feature may comprise an axially tapering portion of the piston radial surface, wherein at a given location along the axis of the cylinder casing, the radial spacing between the inner cylindrical surface and the piston radial surface changes with translation of the piston. The probe may comprise a distance sensor sensing the distance of the piston radial surface from the distance sensor.

In some examples, the injection unit may further comprise rotary drive means coupled to the piston for selectively rotating the piston about the axis while the piston translates within the cylinder casing. The piston may be rotated relative to the cylinder casing by the rotary drive means.

According to some aspects, an injection unit comprises: a cylinder casing comprising an inner cylindrical surface extending along an axis; a piston housed in the casing and translatable along the axis between an advanced and a retracted position, the piston comprising a piston radial surface in facing relation to the inner cylindrical surface; the piston radial surface comprising a measurement detection feature; a pressure chamber extending radially between the inner cylindrical surface and the piston radial surface, the pressure chamber communicating with a source of pressurized fluid for urging the piston towards one of the advanced and retracted positions; and a probe extending through the cylinder casing and in communication with the measurement detection feature to measure translation of the piston when in and moving between the advanced and retracted positions.

In some examples, the injection unit further comprises a shot cavity for holding an injection compound. Translation of the piston towards the retracted position may be associated with filling the shot cavity with the injection compound, and translation towards the advanced position may be associated with injecting the injection compound from the shot cavity into the mold. The pressure chamber may urge the piston towards the retracted position when pressurized.

In some examples, the cylinder casing may comprise an outer surface spaced radially outward from the inner cylindrical surface and a cavity extending therebetween, the cavity having opposed open ends at the inner cylindrical surface and the outer surface, and wherein at least a portion of the probe is received within the cavity.

In some examples, the measurement detection feature may comprise a plurality of annular piston teeth concentric with the axis and spaced axially apart along the piston radial surface. The probe may comprise a gear comprising gear teeth extending into the pressure chamber, the gear teeth engaged with the annular piston teeth, wherein translation of the piston induces rotation of the gear. The probe may further comprise a shaft rotationally driven by the gear, the shaft coupled to a sensor for sensing rotation of the shaft.

In some examples, the measurement detection feature may comprise an axially tapering portion of the piston radial surface, and wherein the probe may comprise a distance sensor sensing the distance of the piston radial surface from the distance sensor. The piston may be rotatable about the axis while axially translating within the cylinder casing.

According to some aspects, an injection unit comprises: a cylinder casing comprising an inner cylindrical surface extending along an axis; a piston housed in the casing and translatable along the axis between an advanced and a retracted position, the piston comprising a piston radial surface in facing relation to the inner cylindrical surface the piston radial surface comprising a measurement detection feature; a pressure chamber extending radially between the inner cylindrical surface and the piston radial surface, the pressure chamber containing a fluid for translating the piston when pressurized; and a probe fixed relative to the cylinder casing and extending through the pressure chamber, the probe communicating with the measurement detection feature to continuously measure the axial position of the piston relative to the casing when the piston moves to and between the advanced and retracted positions.

According to some aspects, an actuator associated with translating a shaft comprises a cylinder casing comprising an inner cylindrical surface extending along an axis; a piston housed in the casing and translatable along the axis between an advanced and a retracted position, the piston comprising a piston radial surface in facing relation to the inner cylindrical surface the piston radial surface comprising a measurement detection feature; a pressure chamber extending radially between the inner cylindrical surface and the piston radial surface, the pressure chamber containing a fluid for urging translation of the piston when pressurized; and a probe fixed relative to the cylinder casing and extending through the pressure chamber, the probe communicating with the measurement detection feature to continuously measure the axial position of the piston relative to the casing when the piston moves to and between the advanced and retracted positions. In some examples, the actuator includes a rotary drive for rotating the piston relative to the cylinder casing. In some examples, the pressure chamber is filled with hydraulic fluid.

According to some aspects, a method of measuring the position of a piston in a cylinder, and/or sensing the direction of a piston in a cylinder, comprises the steps of providing a measurement detection feature on the outer radial surface of a piston and positioning a probe along an inner surface of the cylinder traversed by the piston when in and moving between advanced and retracted positions, the probe interacting with the measurement detection feature in a known and predictable manner. In some examples, the method can include engaging the outer surface of the piston with a rotating member, such that translation of the piston induces rotation of the rotating member. Rotation of the rotating member can be converted to axial position of the piston using, for example, an encoder.

DRAWINGS

Reference is made in the detailed description to the accompanying drawings, in which.

DETAILED DESCRIPTION

Various apparatuses or processes will be described below to provide an example of an embodiment of each claimed invention. No embodiment described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any invention disclosed in an apparatus or process described below and for which an exclusive right is not granted by issuance of this patent application may be the subject matter of another protective instrument, for example, a continuing patent application, and the applicants, inventors or owners do not intend to abandon, disclaim or dedicate to the public any such invention by its disclosure in this document.

Figure 1:
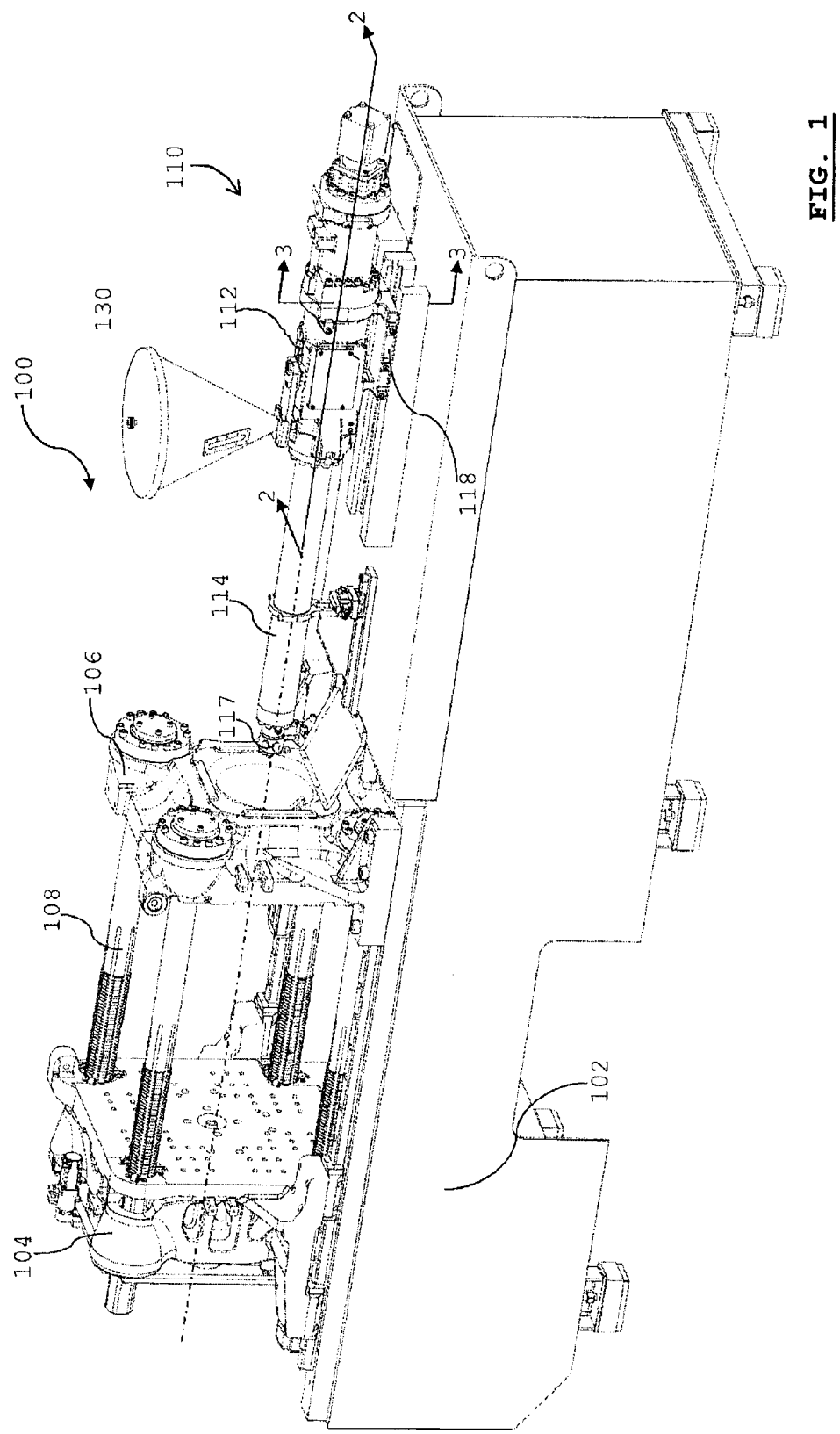
FIG. 1 is a perspective illustration of an injection molding machine.

Referring to FIG. 1, an example of an injection molding machine 100 includes a base 102, with a moving platen 104 and a stationary platen 106 mounted to the base 102 and coupled together via tie bars 108. A mold is formed between the platens 104, 106, the mold defined at least in part by a first mold half mounted to the moving platen 104, and a second mold half mounted to the stationary platen 106. In the example illustrated, the injection molding machine 100 is of the "two-platen machine" variety. In other examples, an injection molding machine may comprise more than two platens.

An injection unit 110 is mounted to the base 102 for injecting resin or other injection compound into the mold to form a molded article. The injection unit 110 generally includes a housing 112 and a barrel 114 extending from the housing 112 towards the platens 104, 106. An injection screw 116 (FIG. 2) is housed within the barrel 114, and a nozzle 117 is mounted at a front end of the barrel 114. The housing 112 may be mounted on a carriage slide 118 for advancing the barrel 114 towards, and retracting the barrel 114 from, the platens 104, 106.

Figure 2:
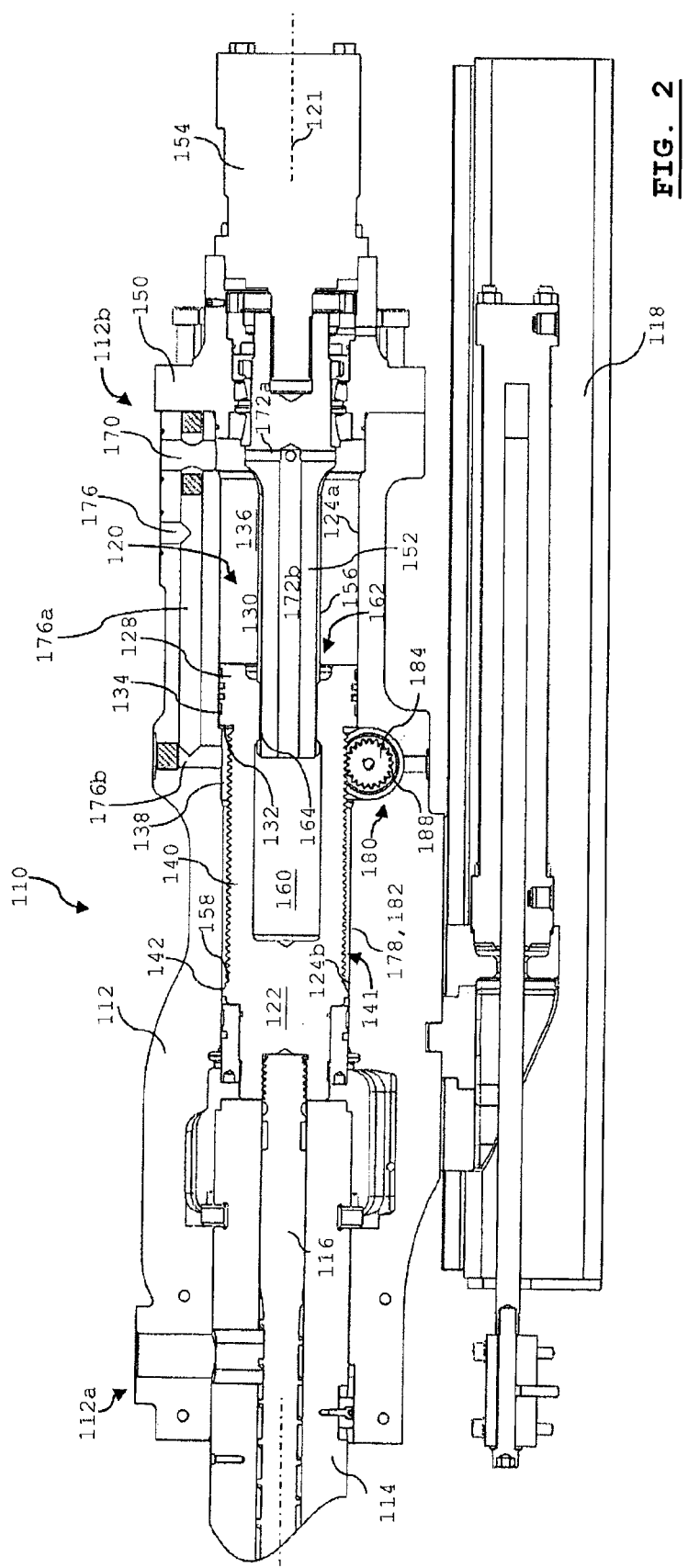
FIG. 2 is a cross-section taken along line 2-2 in FIG. 1.

Referring to FIG. 2, the injection unit 110 includes a cylinder casing 120 for slidably supporting a piston 122. The cylinder casing 120 extends along a cylinder axis 121. The housing 112 in the example illustrated has a first (front) portion 112a proximate the barrel 114, and a second (back) portion 112b distal the barrel 114, and the cylinder casing 120 may comprise an inner cylindrical surface 124 positioned generally intermediate the front and back portions of the housing 112a, 112b. The cylinder casing 120 may be integrally formed with the housing. In the example illustrated, the inner cylindrical surface 124 of the casing 120 comprises an inner surface of the housing 112. The cylindrical surface 124 has a first portion 124a with a first bore diameter and a second portion 124b with a second bore diameter. In the example illustrated, the first bore diameter is larger than the second bore diameter.

The piston 122 is, in the example illustrated, connected at a first (front) end to the injection screw 116. Translation and rotation of the piston 122 causes, in the example illustrated, a corresponding translation and rotation of the injection screw 116. The piston 122, in the example illustrated, includes a piston head 128 with axially opposed first and second faces 130, 132, the first face 130 disposed rearwardly of the second face 132. At least a portion of a radially outer surface extending between the first and second faces 130, 132 defines a first seal journal 134. The first seal journal 134 generally separates an interior volume of the cylindrical casing 120 into a first pressure chamber 136 (on the back, first-face side of the piston head 128) and a second pressure chamber 138 (on the front, second-face side of the piston head 128).

The piston 122 further includes a generally cylindrical body portion 140 (having a radially outer surface 141) extending axially from the second face 132 of the piston head 128, away from the first face 130. The cylindrical piston body 140 is coaxial with, and has a smaller diameter than, the diameter of the first seal journal 134, so that the second (front) face 132 of the piston head comprises an annular surface extending radially between the outer radial surface 141 of the piston body 140 and the outer diameter of the first seal journal 134. A second seal journal 142 is provided adjacent a front end of the piston body 140 spaced axially apart from the first seal journal 134.

The first pressure chamber 136 extends axially between the first (back) face 130 of the piston head 134 and an end cap 150 mounted adjacent the back portion 112b of the housing 112. In the example illustrated, the end cap 150 rotatably supports a splined shaft 152 that protrudes towards the front portion 112a of the housing 112. The splined shaft 152 is urged to rotate by a rotary drive 154, which, in the example illustrated comprises an hydraulic motor. The splined shaft 152 has an outer surface with longitudinal teeth 156 (splines) extending parallel to the cylinder axis 121. The first pressure chamber 136 extends radially generally between the outer surface of the splined shaft 152 and the first inner surface 124a of the first portion of the cylinder casing.

In the example illustrated, the second pressure chamber 138 extends axially between the second face 132 of the piston head adjacent the first seal journal 144 and a front wall 158 adjacent the second seal journal 142. The second pressure chamber 138 extends radially between the radial surface 141 of the piston body 140 and the second inner surface 124b of the cylinder casing. This second inner surface 124b is engaged by the second seal journal 142 as the piston 126 moves between the advanced and retracted positions.

The axially opposed annular second face 132 and front wall 158 of the second pressure chamber 148 are, in the example illustrated, each fixed relative to the piston body 140. The effective surface area of the second face 132 is greater than the effective surface of the front wall 158, so that when the second pressure chamber 148 is pressurized with fluid, a net force is exerted urging the piston 122 towards the retracted position (towards the cylinder cap 150). In the example illustrated, the second face 132 and the front wall 158 have a common inner radial extent defined by the outer surface 141 of the piston body 140. The second face 132 has an outer radial extent generally equal to the first bore diameter, and the front wall 158 has an outer radial extent generally equal to the second bore diameter, and the first bore diameter is greater than the second bore diameter.

The piston body 140 is further provided with an interior cavity 160 that has an axial opening 162 at the back end of the piston body for receiving the splined shaft. The cavity 160 has an axial extent that is generally long enough to accommodate the length of the shaft 152 when the piston moves from the advanced position to the retracted position. A spline nut 164 may be provided at the inner radial surface of the opening at the back end of the piston cavity. The spline nut 164 may be separately attached to the piston body 140, or may be of integral, unitary construction with the piston body 140. The spline nut 164 may comprise a female spline profile that engages the splines 156 of the shaft 152 in an axially sliding, rotationally locked, engagement. The spline nut need not prevent axial fluid flow across the nut. For example, fluid can generally pass axially from one side of the nut 156 to the other by working its way between the internal and external spline profiles. Additionally or alternatively, axial flow passages can be provided in the spline nut 164 to facilitate flow of fluid through the nut. Operating in a fluid-filled environment can facilitate smooth and long-lasting operation of the spline nut and shaft 152.

Fluid communication with the first and second pressure chambers 136, 138 may be provided with suitable fluid ports and channels. In the example illustrated, a first fluid port 170 extends through the housing 112 and provides fluid communication to the first pressure chamber 136 via a radial channel 172a adjacent the back end of the shaft 152, an axial channel 172b extending between the radial channel 172a and the cavity 160 in the piston body, and through the spline nut 164 separating the cavity 160 from the first pressure chamber 136. In the example illustrated, a second fluid port 176 extends through the housing 112 at a position near the first port 170 (to facilitate plumbing) and communicates with the second pressure chamber via an axial channel 176a and radial channel 176b.

The injection unit 110 may further be provided with a piston position measurement system for measuring the axial position of the piston relative to the cylinder casing when the piston is in and moving between the advanced and retracted positions. Accurately tracking the translation of the piston can facilitate, for example, reliably and repeatably injecting the desired volume of compound into the mold during each machine cycle.

In the example illustrated, the piston outer radial surface 141 includes a measurement detection feature 178. A probe 180 is supported by the cylinder casing 120, and communicates with the measurement detection feature 178 to continuously measure the axial position of the piston 122 when in and moving between the advanced and retracted positions.

In the example illustrated, the measurement detection feature 178 includes a plurality of annular piston teeth 182 concentric with the axis 121 and spaced axially apart along the piston radial surface 141. The probe 180 includes a gear 184 that is rotatable about a gear axis 186 oriented generally perpendicular to the cylinder axis 121. The gear 184 is provided with gear teeth 188 that are engaged with the annular piston teeth 182 such that that translation of the piston 122 induces rotation of the gear 184. The gear teeth 188 remain engaged with the annular piston teeth 182 regardless of the axial position of the piston 122 along its axis 121. The engagement of the gear teeth 188 with the annular piston teeth 182 also accommodates rotation of the piston 122 about the cylinder axis 121, whether the piston 122 is axially translating or stationary.

Figure 3:
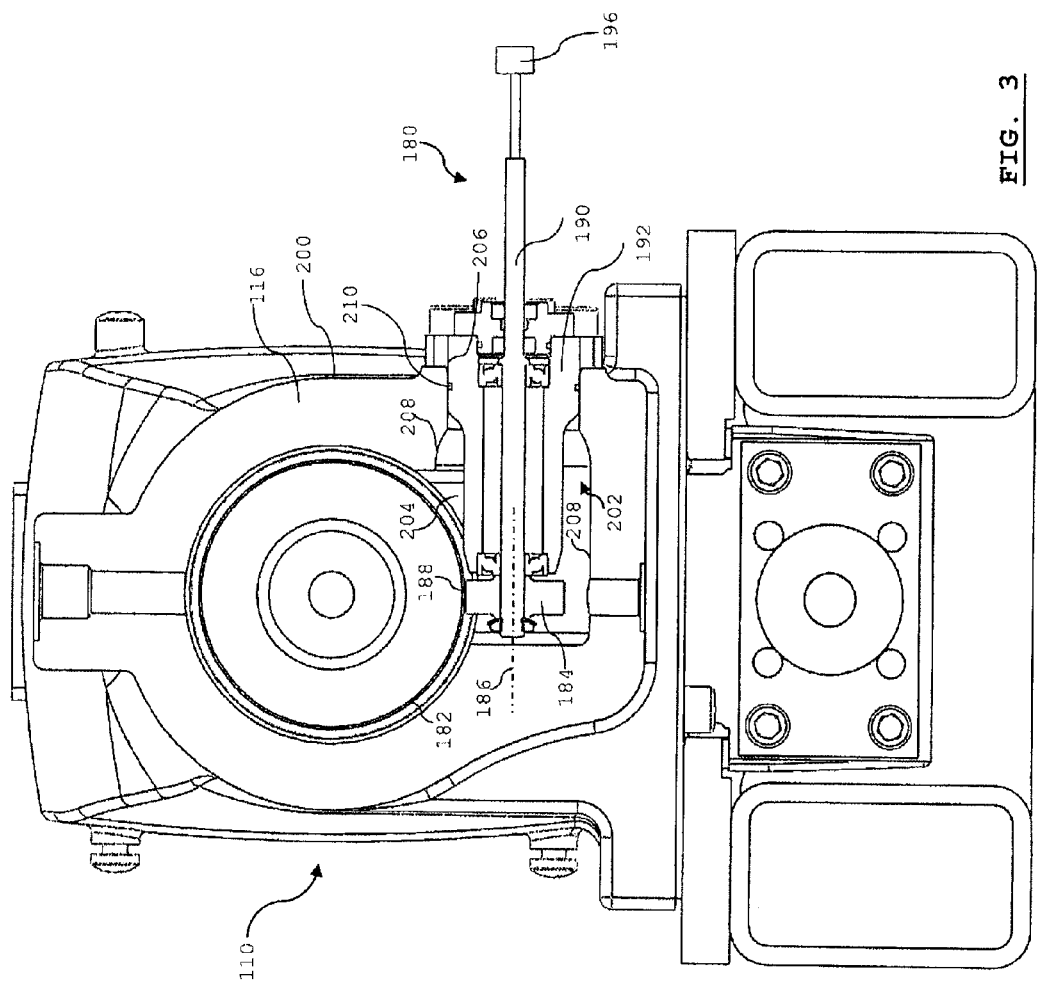
FIG. 3 is a cross-section taken along line 3-3 in FIG. 1.
Figure 4:
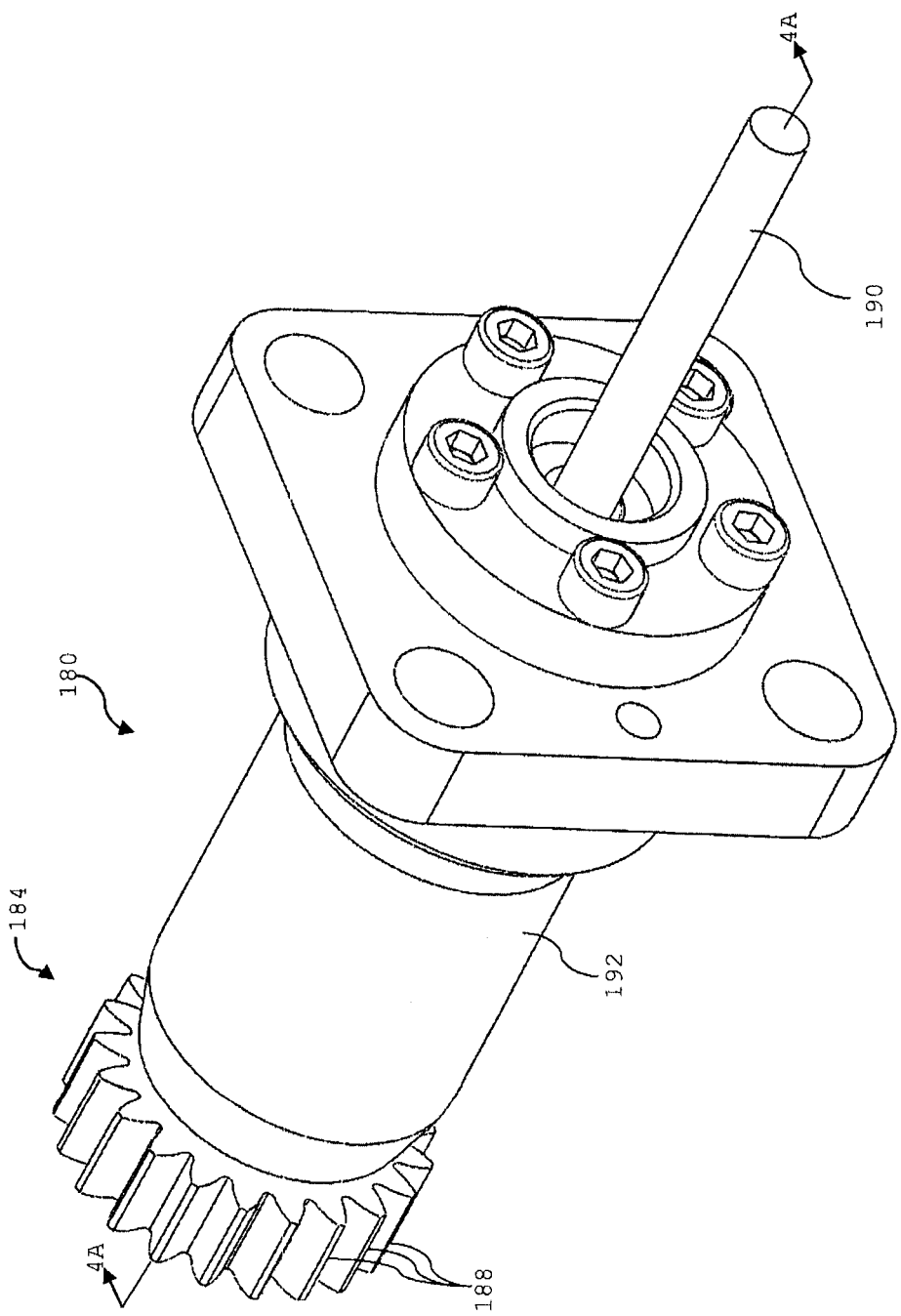
FIG. 4 is a perspective view of a probe portion of the structure of FIG. 2.
Figure 4A:
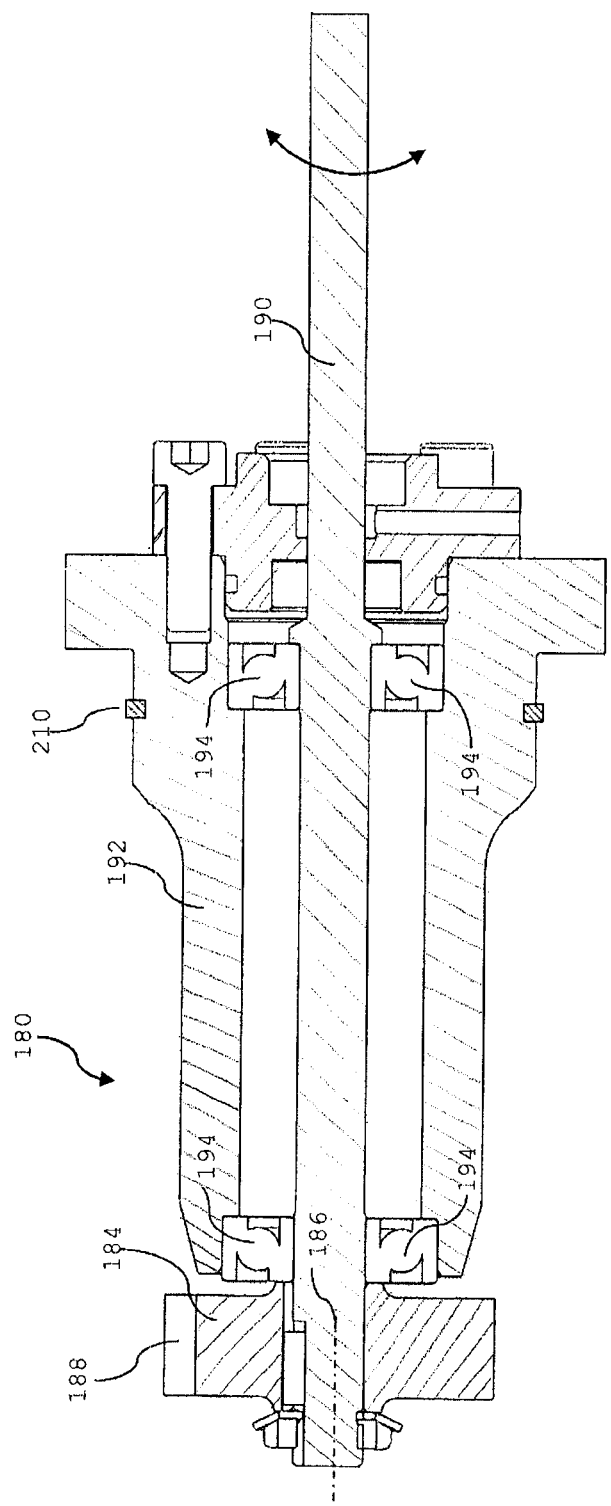
FIG. 4A is a cross-section taken along line 4A-4A in FIG. 4.

Referring now to FIGS. 3 and 4A, the probe 180 may further include a shaft 190 fixed to the gear 184, and which is rotationally driven by the gear 184. In the example illustrated, the shaft 190 is received within a probe housing 192 and is rotatably supported within the housing 192 by a plurality of bearings 194. The shaft 190 may be coupled to a sensor 196 for sensing rotation of the shaft 190. The sensor 196 can comprise, for example, an encoder. By processing signals from the sensor 196, rotation of the gear 184 can be converted into an accurate determination of the corresponding translation of the piston 122.

The probe 180 is, in the example illustrated, supported by the cylinder casing 120. Referring still to FIG. 3, in the example shown, the probe 180 extends through the cylinder casing 116. The cylinder casing 120 includes an outer surface 200 spaced radially outward from the inner cylindrical surface 124, and a cavity 202 extending therebetween. The cavity 202 has opposed inner and outer ends 204, 206, and a cavity sidewall 208 extends between the ends 204, 206. At least a portion of the probe 180 is received within the cavity 202, and in the example illustrated, a seal 210 is provided about an outer surface of the probe housing 192 and in pressed engagement with the cavity sidewall 208 adjacent the outer open end 206.

In the example illustrated, the probe 180 extends into the second pressure chamber 138 which, when pressurized, urges the piston 122 from the advanced to the retracted position. During operation, the maximum pressure in the second pressure chamber 138 is substantially less than the maximum pressure reached in the first pressure chamber 136. Placing the probe 180 in the second pressure chamber 138 can help to reduce the risk of oil leakage and/or simplify the sealed installation of the probe 180. Furthermore, having the teeth 182, 188 interengage in an oil-filled chamber can improve the operation of the probe 180 and reduce wear.

Figure 5:
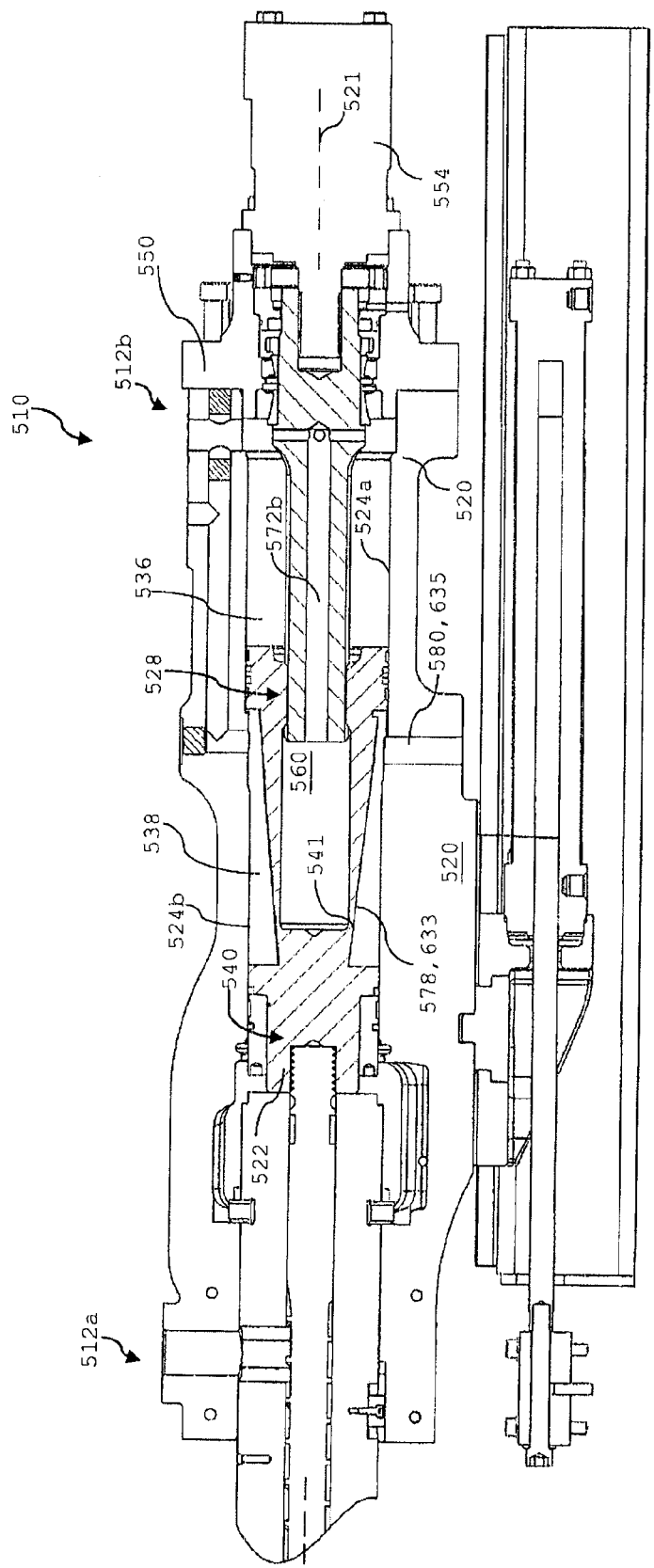
FIG. 5 is a cross-sectional view of a portion of another example of an injection molding machine, the cross-sectional view generally corresponding to that of the cross section of the example of FIG. 2.

Referring now to FIG. 5, portions of another example of an injection molding machine 300 are illustrated. The injection molding machine 500 is in ways similar to the machine 100, and like features are identified by like reference characters, incremented by 400. The machine 500 includes a measurement detection feature 578 comprising an axially tapering portion 633 of the piston radial surface 541. In the example illustrated, the piston radial surface 541 tapers (radially inwardly) from a larger diameter adjacent the second (back) end of the piston 522 to a smaller diameter adjacent the first (front) end of the piston 522. As the piston 522 translates, the radial spacing or distance between the piston radial surface 541 and the inner cylindrical surface 536 changes at a given point along the axial length of the inner cylindrical surface 524 (portion 524b in the example illustrated) changes. The probe 580 includes a distance sensor 635, which is supported by the cylinder casing 520. The distance sensor 635 senses the change in distance from a fixed portion of the sensor 635 to the tapering portion 633 of the piston radial surface 541. The distance sensor 635 can be non-contact (e.g. a proximity sensor) or a contact device (e.g. displacement transducer). The probe may include wiring that may couple the distance sensor 635 to a processing unit. The processing unit may be configured to determine the axial position of the piston 522 within the cylinder casing 520 based on the distance measured by the sensor 635. The probe 580 is, in the example illustrated, received in a cavity of the cylinder casing 520 and is sealed thereto, and the probe 580 extends through the cylinder casing 520.

In the example of FIG. 5, the distance sensor 635 of the probe 580 extends through the cylinder casing 520, and the wiring of the probe 580 may be external to the cylinder casing 520. In alternate examples, a distance sensor of a probe may be mounted to the inner cylindrical surface of the cylinder casing, and wiring of the probe may extend through the cylinder casing.

Figure 6:
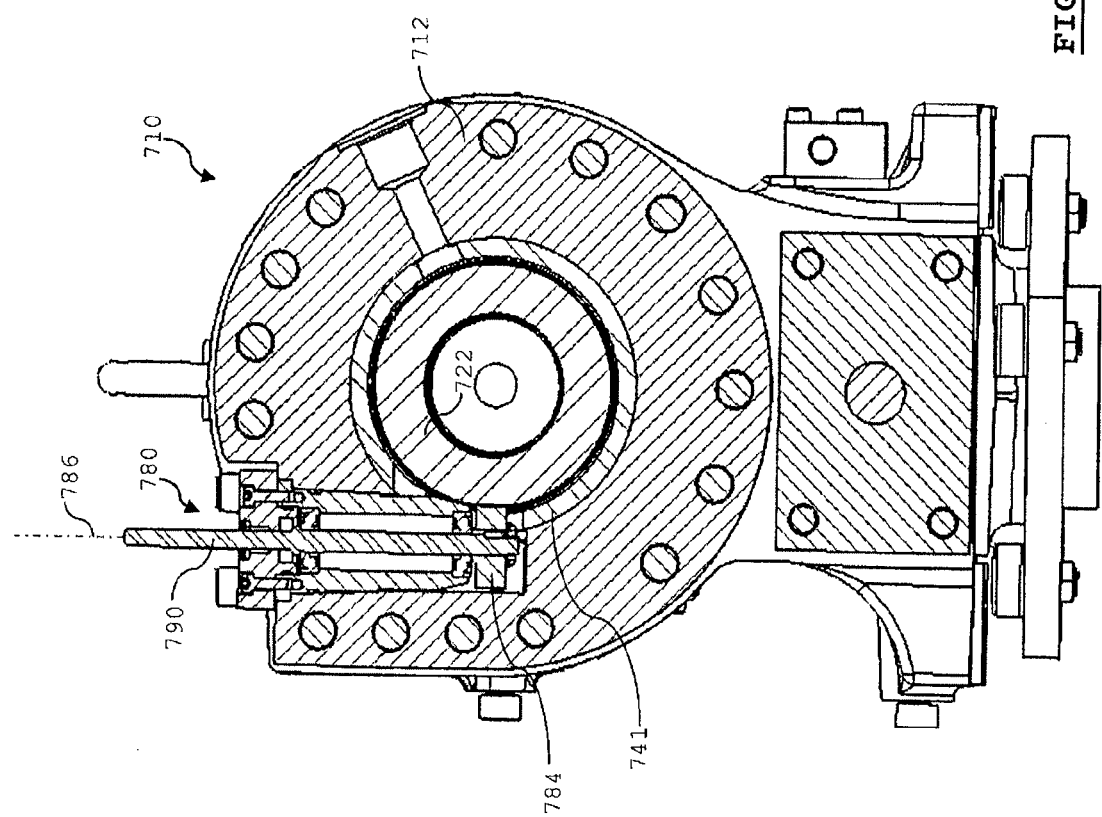
FIG. 6 is a cross-sectional view of a portion of another example of an injection molding machine, the view generally corresponding to the view of FIG. 3.

Referring now to FIG. 6, portions of an injection unit 710 of an injection machine 700 are illustrated. The machine 700 is in ways similar to the machine 100, and like features are identified by like reference characters, incremented by 600. The injection unit 710 comprises a cylinder casing 720 with a piston 722 slidably mounted therein. The injection unit includes a piston position measurement system comprising a measurement detection feature 778 and a probe 780 that communicates with the detection feature 778 to continuously measure the axial position of the piston 722 when in and moving between its advanced and retracted positions.

In the example illustrated, the measurement detection feature 778 includes a plurality of annular piston teeth 782 concentric with the axis 721 and spaced axially apart along the piston radial surface 741. The probe 780 includes a gear 784 that is rotatable about a gear axis 786 oriented generally perpendicular to the cylinder axis 721. In the example illustrated, the gear axis 786 is oriented generally vertically (instead of the generally horizontally oriented gear axis 186). The gear 786 is provided with gear teeth 788 that are engaged with the annular piston teeth 782 such that that translation of the piston 722 induces rotation of the gear 784. The gear teeth 788 remain engaged with the annular piston teeth 782 regardless of the axial position of the piston 722 along its axis 721. The engagement of the gear teeth 788 with the annular piston teeth 782 also accommodates rotation of the piston 722 about the cylinder axis 721, whether the piston 722 is axially translating or stationary.

Figure 7:
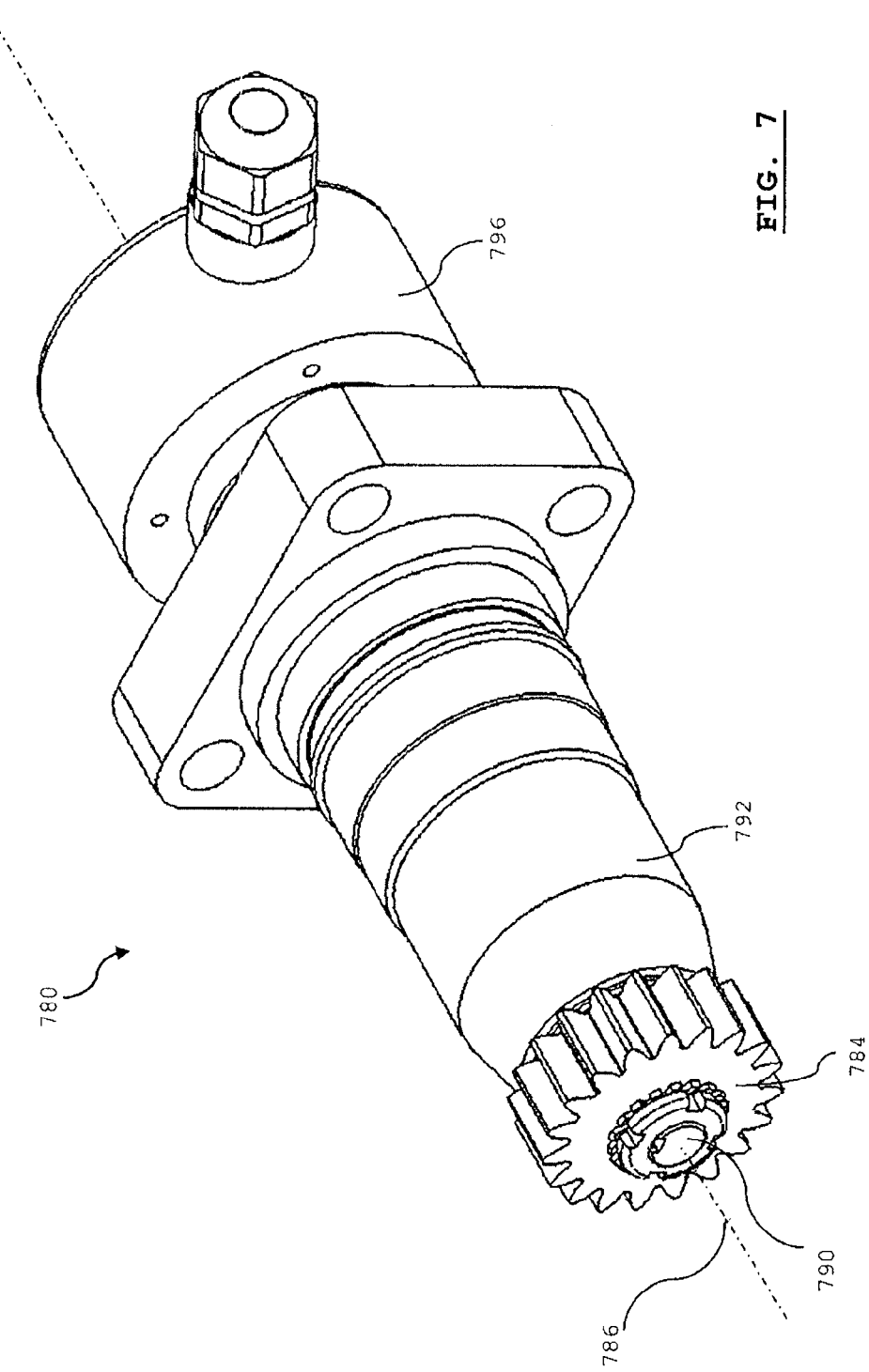
FIG. 7 is a perspective view of a probe portion of the structure of FIG. 6.

With reference also to FIG. 7, the probe 780 may further include a shaft 790 fixed to the gear 784, and which is rotationally driven by the gear 784. In the example illustrated, the shaft 790 is received within a probe housing 792 and is rotatably supported within the housing 792 by a plurality of bearings 794. The shaft 790 may be coupled to a sensor 796 for sensing rotation of the shaft 790. The sensor 796 can comprise, for example, an encoder. By processing signals from the sensor 796, rotation of the gear 784 can be converted into an accurate determination of the corresponding translation of the piston 722.

The invention claimed is:

1. An injection unit comprising:
  (a) a cylinder casing comprising an inner cylindrical surface extending along an axis;
  (b) a piston housed in the casing and translatable along the axis between an advanced and a retracted position, the piston comprising a piston radial surface in facing relation to the inner cylindrical surface, the piston radial surface comprising a measurement detection feature;
  c) a probe fixed relative to the cylinder casing, the probe communicating with the measurement detection feature when the piston is in and moving between the advanced and retracted positions to measure the translation of the piston,
  wherein the cylinder casing comprises an outer surface spaced radially outward from the inner cylindrical surface and a cavity extending therebetween, the cavity having opposed open ends at the inner cylindrical surface and the outer surface, and wherein at least a portion of the probe is received within the cavity.

2. The injection unit of claim 1, further comprising a pressure chamber extending radially between the inner cylindrical surface and the piston radial surface.

3. The injection unit of claim 2, wherein the pressure chamber contains a fluid to move the piston towards one of the advanced position and the retracted position when pressurized.

4. The injection unit of claim 1, wherein the probe extends through the cylinder casing.

5. An injection unit comprising:
a) a cylinder casing comprising an inner cylindrical surface extending along an axis;
b) a piston housed in the casing and translatable along the axis between an advanced and a retracted position, the piston comprising a piston radial surface in facing relation to the inner cylindrical surface, the piston radial surface comprising a measurement detection feature;
c) a probe fixed relative to the cylinder casing, the probe communicating with the measurement detection feature when the piston is in and moving between the advanced and retracted positions to measure the translation of the piston,
wherein the measurement detection feature comprises a plurality of annular piston teeth concentric with the axis and spaced axially apart along the piston radial surface, and
wherein the probe comprises a gear having gear teeth extending radially inwardly of the inner surface, the gear teeth engaged with the annular piston teeth, wherein translation of the piston induces rotation of the gear.

6. The injection unit of claim 5, wherein the probe further comprises a shaft rotationally driven by the gear, the shaft coupled to a sensor for sensing rotation of the shaft.

7. The injection unit of claim 5, further comprising rotary drive means coupled to the piston for selectively rotating the piston about the axis while the piston translates within the cylinder casing.

8. The injection unit of claim 7, wherein the piston is rotated relative to the cylinder casing by the rotary drive means.

9. An injection unit comprising:
a) a cylinder casing comprising an inner cylindrical surface extending along an axis;
b) a piston housed in the casing and translatable along the axis between an advanced and a retracted position, the piston comprising a piston radial surface in facing relation to the inner cylindrical surface; the piston radial surface comprising a measurement detection feature;
c) a pressure chamber extending radially between the inner cylindrical surface and the piston radial surface, the pressure chamber communicating with a source of pressurized fluid for urging the piston towards one of the advanced and retracted positions; and
d) a probe extending through the cylinder casing and in communication with the measurement detection feature to measure translation of the piston when in and moving between the advanced and retracted positions,
wherein the measurement detection feature comprises a plurality of annular piston teeth concentric with the axis and spaced axially apart along the piston radial surface, and
wherein the probe comprises a gear comprising gear teeth extending into the pressure chamber, the gear teeth engaged with the annular piston teeth, wherein translation of the piston induces rotation of the gear.

10. The injection unit of claim 9 further comprising a shot cavity for holding an injection compound, wherein translation of the piston towards the retracted position is associated with filling the shot cavity with the injection compound, and translation towards the advanced position is associated with injecting the injection compound from the shot cavity into the mold, and wherein the pressure chamber urges the piston towards the retracted position when pressurized.

11. The injection unit of claim 9, wherein the cylinder casing comprises an outer surface spaced radially outward from the inner cylindrical surface and a cavity extending therebetween, the cavity having opposed open ends at the inner cylindrical surface and the outer surface, and wherein at least a portion of the probe is received within the cavity.

12. The injection unit of claim 9, wherein the probe further comprises a shaft rotationally driven by the gear, the shaft coupled to a sensor for sensing rotation of the shaft.

13. An injection unit comprising:
a) a cylinder casing comprising an inner cylindrical surface extending along an axis;
b) a piston housed in the casing and translatable along the axis between an advanced and a retracted position, the piston comprising a piston radial surface in facing relation to the inner cylindrical surface; the piston radial surface comprising a measurement detection feature;
c) a pressure chamber extending radially between the inner cylindrical surface and the piston radial surface, the pressure chamber communicating with a source of pressurized fluid for urging the piston towards one of the advanced and retracted positions; and
d) a probe extending through the cylinder casing and in communication with the measurement detection feature to measure translation of the piston when in and moving between the advanced and retracted positions,
wherein the measurement detection feature comprises an axially tapering portion of the piston radial surface, and wherein the probe comprises a distance sensor sensing the distance of the piston radial surface from the distance sensor.

14. An injection unit comprising:
a) a cylinder casing comprising an inner cylindrical surface extending along an axis;
b) a piston housed in the casing and translatable along the axis between an advanced and a retracted position, the piston comprising a piston radial surface in facing relation to the inner cylindrical surface, the piston radial surface comprising a measurement detection feature;
c) a pressure chamber extending radially between the inner cylindrical surface and the piston radial surface, the pressure chamber containing a fluid for translating the piston when pressurized; and
d) a probe fixed relative to the cylinder casing and extending through the fluid in the pressure chamber, the probe communicating with the measurement detection feature to continuously measure the axial position of the piston relative to the casing when the piston moves to and between the advanced and retracted positions.

15. The injection unit of claim 14, wherein the pressure chamber is disposed axially between first and second seal journals, the first and second seal journals providing sealed sliding engagement between the inner cylindrical surface and the piston radial surface.

16. The injection unit of claim 15, wherein the axial spacing between the first and second seal journals remains constant when the piston is in and moving between the advanced and retracted positions.

17. The injection unit of claim 14 further comprising a shot cavity for holding an injection compound, wherein translation of the piston towards the retracted position is associated with filling the shot cavity with the injection compound, and translation towards the advanced position is associated with injecting the injection compound from the shot cavity into the mold, and wherein the pressure chamber urges the piston towards the retracted position when pressurized.

18. The injection unit of claim 14, wherein the cylinder casing comprises an outer surface spaced radially outward from the inner cylindrical surface and a cavity extending therebetween, the cavity having opposed open ends at the inner cylindrical surface and the outer surface, the open end at the inner cylindrical surface opening into the pressure chamber, and wherein at least a portion of the probe is received within the cavity.

19. The injection unit of claim 14, wherein the measurement detection feature comprises a plurality of annular piston teeth concentric with the axis and spaced axially apart along the piston radial surface.

20. The injection unit of claim 19, wherein the probe comprises a gear comprising gear teeth extending into the pressure chamber, the gear teeth engaged with the annular piston teeth, wherein translation of the piston induces rotation of the gear.

21. The injection unit of claim 20, wherein the probe further comprises a shaft rotationally driven by the gear, the shaft extending from inside the pressure chamber to outside the cylinder casing and oriented perpendicular to the axis, and the shaft coupled to a sensor for sensing rotation of the shaft.

22. The injection unit of claim 14, wherein the measurement detection feature comprises an axially tapering portion of the piston radial surface, and wherein the probe comprises a distance sensor sensing the distance of the piston radial surface from the distance sensor.

23. The injection unit of claim 14, wherein the piston is rotatable about the axis while axially translating within the cylinder casing.

\* \* \* \* \*